United States Patent
Nakagawa et al.

(10) Patent No.: US 8,843,259 B2
(45) Date of Patent: Sep. 23, 2014

(54) CONTROL APPARATUS FOR HYBRID VEHICLE

(75) Inventors: Norihisa Nakagawa, Numazu (JP); Takashi Nishikiori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 76 days.

(21) Appl. No.: 13/695,655

(22) PCT Filed: Jul. 26, 2010

(86) PCT No.: PCT/JP2010/062542
§ 371 (c)(1),
(2), (4) Date: Nov. 1, 2012

(87) PCT Pub. No.: WO2012/014270
PCT Pub. Date: Feb. 2, 2012

(65) Prior Publication Data
US 2013/0116872 A1    May 9, 2013

(51) Int. Cl.
  *B60W 20/00* (2006.01)
  *B60K 6/445* (2007.10)
  *B60W 10/06* (2006.01)
  *B60W 10/08* (2006.01)

(52) U.S. Cl.
  CPC ............. *B60W 20/00* (2013.01); *Y02T 10/6239* (2013.01); *B60K 6/445* (2013.01); *Y02T 10/6286* (2013.01); *Y02T 10/54* (2013.01); *B60W 10/06* (2013.01); *Y10S 903/903* (2013.01); *B60W 10/08* (2013.01)
  USPC ................ 701/22; 701/99; 701/101; 903/903

(58) Field of Classification Search
  CPC .................. F02D 2041/001; F02D 2041/0012; F02D 41/0002; F02D 41/123; F02D 13/06; F02D 13/02; F02D 41/08; F02D 13/0242; F02D 13/0284; B60W 20/00; B60W 2710/0616; B60W 20/1082; B60W 10/08; B60W 10/06; Y02T 10/18; Y02T 10/42; F01L 13/0005; F01L 2013/001; B60K 6/445
  USPC ...................................... 701/22, 99–109, 112
  See application file for complete search history.

(56) References Cited

U.S. PATENT DOCUMENTS 6,059,057 A * 5/2000 Yamazaki et al. ........ 180/65.235
6,389,807 B1 * 5/2002 Suzuki et al. ................... 60/285
(Continued)

FOREIGN PATENT DOCUMENTS

JP    A-2001-182570    7/2001
JP    A-2003-74385     3/2003
(Continued)

*Primary Examiner* — Helal A Algahaim
*Assistant Examiner* — Genna Mott
(74) *Attorney, Agent, or Firm* — Oliff PLC

(57) ABSTRACT

An engine includes variable valve mechanisms capable of causing an intake valve and an exhaust valve to stop. An ECU estimates poisoning states of catalysts, and executes and prohibits stopping of the valves based on the poisoning states. When stopping of the valves is prohibited during a fuel-cut operation, the ECU drives a crankshaft of the engine by means of a motor to idle the engine. Thus, even in a hybrid vehicle in which the engine is stopped during a fuel-cut operation, a sufficient amount of oxygen can be rapidly supplied to the catalysts by utilizing a pumping action of pistons, and the catalysts can be caused to recover from rich poisoning efficiently.

7 Claims, 7 Drawing Sheets

(56) References Cited

U.S. PATENT DOCUMENTS

| | | |
|---|---|---|
| 6,526,745 B1 | 3/2003 | Ogiso |
| 6,560,960 B2 * | 5/2003 | Nishimura et al. ............. 60/284 |
| 8,321,082 B2 * | 11/2012 | Ando ............................. 701/22 |
| 2009/0048763 A1 | 2/2009 | Nishikiori et al. |
| 2009/0120390 A1 * | 5/2009 | Ezaki et al. ................ 123/90.15 |
| 2010/0250103 A1 * | 9/2010 | Shimo et al. .................. 701/108 |

FOREIGN PATENT DOCUMENTS

| | | | | |
|---|---|---|---|---|
| JP | 2004-143990 | * | 5/2004 | ............. F02D 41/12 |
| JP | A-2005-194885 | | 7/2005 | |
| JP | A-2006-266115 | | 10/2006 | |
| JP | A-2007-211720 | | 8/2007 | |
| JP | A-2007-321665 | | 12/2007 | |
| JP | A-2009-203934 | | 9/2009 | |

* cited by examiner

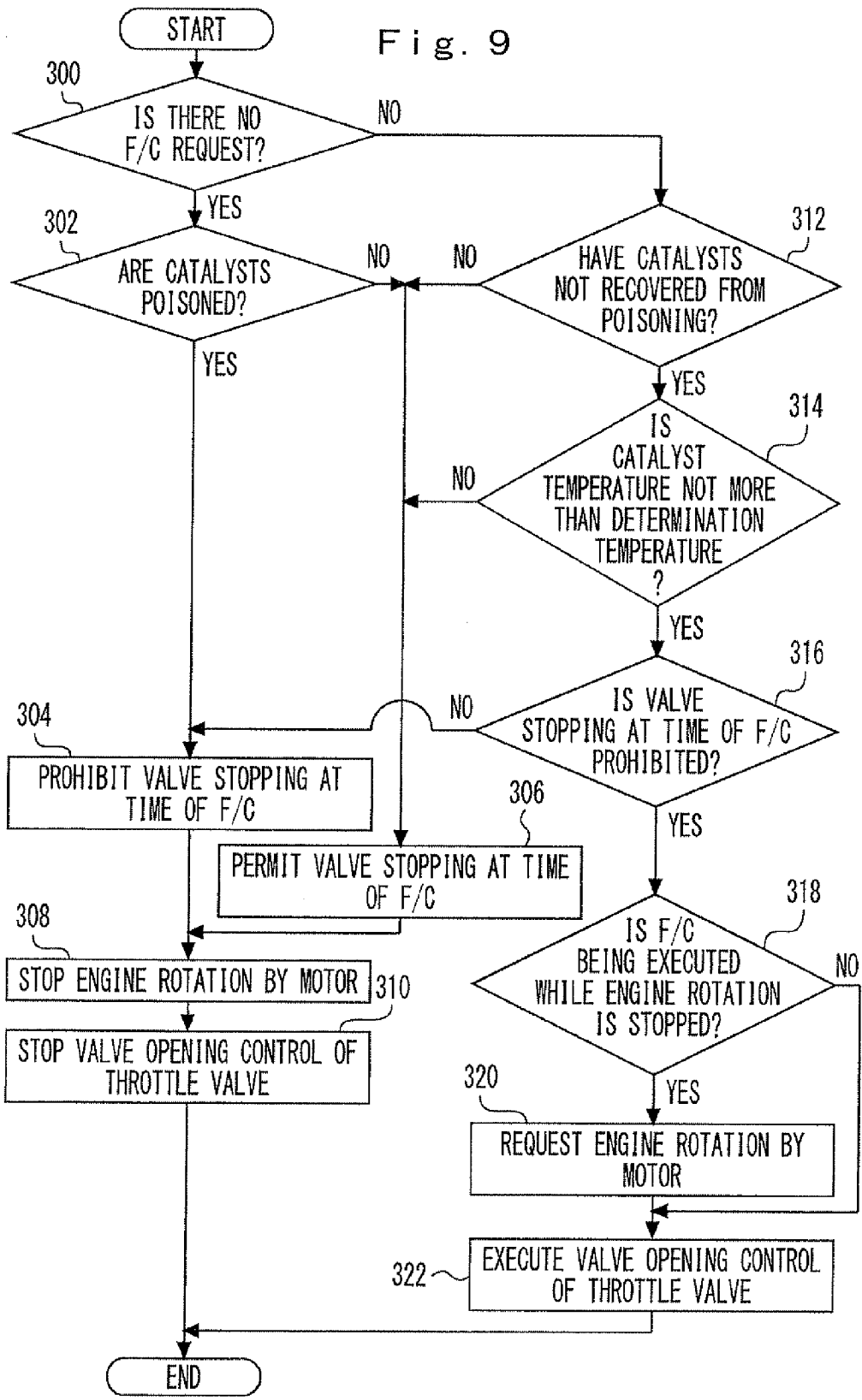

CONTROL APPARATUS FOR HYBRID VEHICLE

TECHNICAL FIELD

The present invention relates to a control apparatus for a hybrid vehicle that has an internal combustion engine and a motor, and more particularly to a control apparatus for a hybrid vehicle in which an internal combustion engine that includes a valve stop mechanism is mounted.

BACKGROUND ART

The conventional technology includes a control apparatus for an internal combustion engine that is equipped with a valve stop mechanism, as disclosed, for example, in Patent Literature 1 (Japanese Patent Laid-Open No. 2001-182570). According to the conventional technology, a configuration is adopted that actuates the valve stop mechanism during a fuel-cut operation, and maintains at least one valve among an intake valve and an exhaust valve in a closed state. Thus, according to the conventional technology, a supply of air (fresh air) that has passed through a combustion chamber to a catalyst is suppressed during a fuel-cut operation, and deterioration of the catalyst that is caused by contact with air is prevented.

The applicants are aware of the following literature, which includes the above described literature, as literature related to the present invention.

CITATION LIST

Patent Literature

Patent Literature 1: Japanese Patent Laid-Open No. 2001-182570
Patent Literature 2: Japanese Patent Laid-Open No. 2006-266115
Patent Literature 3: Japanese Patent Laid-Open No. 2007-321665

SUMMARY OF INVENTION

Technical Problem

According to the above described conventional technology, a configuration is adopted that suppresses the supply of air to a catalyst during a fuel-cut operation. However, there is the problem that when a state in which the catalyst is cut off from air (oxygen) continues, a phenomenon (so-called "rich poisoning") in which a precious metal contained in the catalyst is covered by reduction components such as HC or CO is liable to occur.

The present invention has been conceived to solve the above described problem, and an object of the present invention is to provide a control apparatus for a hybrid vehicle that is capable of preventing rich poisoning of a catalyst by utilizing a motor while an internal combustion engine is stopped.

Means for Solving the Problem

A first aspect of the present invention is a control apparatus for a hybrid vehicle that comprises:

an internal combustion engine comprising a valve stop mechanism capable of stopping at least one valve among an intake valve and an exhaust valve in a closed state, and a catalyst that purifies exhaust gas;

a motor that is an electric motor that, together with the internal combustion engine, constitutes a power source of the vehicle, and that is capable of driving an output shaft of the internal combustion engine that is in a stopped state;

poisoning state estimation means that estimates a poisoning state of the catalyst based on an operating state of the internal combustion engine;

fuel-cut operation control means that, when a predetermined fuel-cut operation condition is established during operation of the internal combustion engine, executes a fuel-cut operation that stops a fuel supply to the internal combustion engine;

valve operation control means that, during the fuel-cut operation, controls the valve stop mechanism and executes and prohibits valve stopping with respect to the valve based on a poisoning state of the catalyst; and engine idling means that, during the fuel-cut operation, when valve stopping with respect to the valve is prohibited by the valve operation control means, drives the output shaft of the internal combustion engine by means of the motor and supplies oxygen to the catalyst.

In a second aspect of the present invention, further comprising throttle valve opening control means that, during the fuel-cut operation, when valve stopping with respect to the valve is prohibited by the valve operation control means, opens a throttle valve of the internal combustion engine.

In a third aspect of the present invention, wherein the valve operation control means is configured to prohibit valve stopping during the fuel-cut operation in a case where it is estimated by the poisoning state estimation means that the catalyst is in a rich poisoning state, and a temperature of the catalyst is less than or equal to a predetermined determination temperature.

In a fourth aspect of the present invention, wherein the valve operation control means is configured so that, in a state in which valve stopping during the fuel-cut operation is prohibited, if the catalyst recovers from a rich poisoning state as a result of receiving an oxygen supply, the valve operation control means releases prohibition of the valve stopping.

In a fifth aspect of the present invention, wherein the engine idling means is configured so that, in a state in which the output shaft of the internal combustion engine is driven by the motor, if the catalyst recovers from a rich poisoning state as a result of receiving an oxygen supply, the engine idling means stops driving of the output shaft.

In a sixth aspect of the present invention, wherein the poisoning state estimation means is configured to estimate whether or not the catalyst is in a rich poisoning state based on an integrated value of fuel injection amounts and/or an integrated value of intake air amounts of the internal combustion engine.

In a seventh aspect of the present invention, wherein the poisoning state estimation means is configured to estimate whether or not the catalyst is in a rich poisoning state based on a stopping period of the internal combustion engine or a duration of the valve stopping.

In a eighth aspect of the present invention, wherein the poisoning state estimation means is configured to estimate whether or not the catalyst has recovered from a rich poisoning state based on an integrated value of intake air amounts during the fuel-cut operation.

Advantageous Effects of Invention

According to the first invention, during a fuel-cut operation, the valve operation control means can execute valve stopping with respect to an intake valve and/or an exhaust valve (hereunder, referred to simply as "valve") or can prohibit valve stopping based on a poisoning state of a catalyst. More specifically, when the catalyst is not in a rich poisoning state, the valve operation control means can execute valve stopping and cut off the oxygen supply to the catalyst to thereby suppress deterioration of the catalyst. Further, when the catalyst is in a rich poisoning state, the valve operation control means can prohibit valve stopping to thereby supply oxygen to the catalyst. Thus, the catalyst can be caused to recover from rich poisoning, and exhaust emissions can be improved. Thus, valve stopping and valve stopping prohibition can be used appropriately in accordance with the poisoning state of the catalyst. Further, in a state in which valve stopping is prohibited, the engine idling means can drive an output shaft of the internal combustion engine using the motor. Thus, in a hybrid vehicle that stops an internal combustion engine during a fuel-cut operation, an adequate amount of oxygen can be rapidly supplied to a catalyst by utilizing a pumping action of the pistons, and the catalyst can be caused to recover from rich poisoning efficiently.

According to the second invention, the throttle valve opening control means can open the throttle valve in a case where valve stopping is prohibited during a fuel-cut operation. It is thereby possible to reduce intake resistance and lower the pumping loss in cylinders, and lessen the load of the motor. Further, the air amount that is supplied to the catalyst can be increased while suppressing the number of revolutions of the internal combustion engine to a minimum, and thus recovery from rich poisoning can be promoted. Accordingly, electric power consumption of the motor can be suppressed and fuel consumption can be improved.

According to the third invention, when the catalyst is in a rich poisoning state and the catalyst temperature is equal to or less than a determination temperature, the valve operation control means prohibits valve stopping during a fuel-cut operation. Thus, at a time of a high temperature when the catalyst temperature is higher than the determination temperature and deterioration of the catalyst is liable to occur, valve stopping can be continued and the catalyst can be protected from deterioration. Further, since it is difficult for rich poisoning to progress when the catalyst temperature is higher than the determination temperature, the progress of rich poisoning can be adequately suppressed even without prohibiting valve stopping.

According to the fourth invention, the valve operation control means releases the prohibition of valve stopping when the catalyst has recovered from a rich poisoning state. Thus, valve stopping can be executed and deterioration of the catalyst can be suppressed. Further, the inside of a cylinder can be maintained in a stoichiometric atmosphere by valve stopping, and fuel consumption can be improved.

According to the fifth invention, the engine idling means stops driving of the output shaft of the internal combustion engine when the catalyst has recovered from a rich poisoning state. Thus, electric power consumption of the motor can be suppressed to a necessary minimum.

According to the sixth invention, the poisoning state estimation means can accurately estimate whether or not the catalyst is in a rich poisoning state based on an integrated value of fuel injection amounts of the internal combustion engine or an integrated value of intake air amounts excluding intake air amounts at a time of a fuel-cut operation of the internal combustion engine.

According to the seventh invention, the poisoning state estimation means can accurately estimate whether or not the catalyst is in a rich poisoning state based on a stopping period of the internal combustion engine or a duration of valve stopping.

According to the eighth invention, the poisoning state estimation means can accurately estimate whether or not the catalyst has recovered from a rich poisoning state based on an integrated value of intake air amounts during a fuel-cut operation.

BRIEF DESCRIPTION OF DRAWINGS

FIG. 9 is a flowchart showing other control that is executed instead of the control shown in FIG. 8 according to Embodiment 1 of the present invention.

DESCRIPTION OF EMBODIMENTS

Embodiment 1

[Configuration of Embodiment 1]

Figure 1:
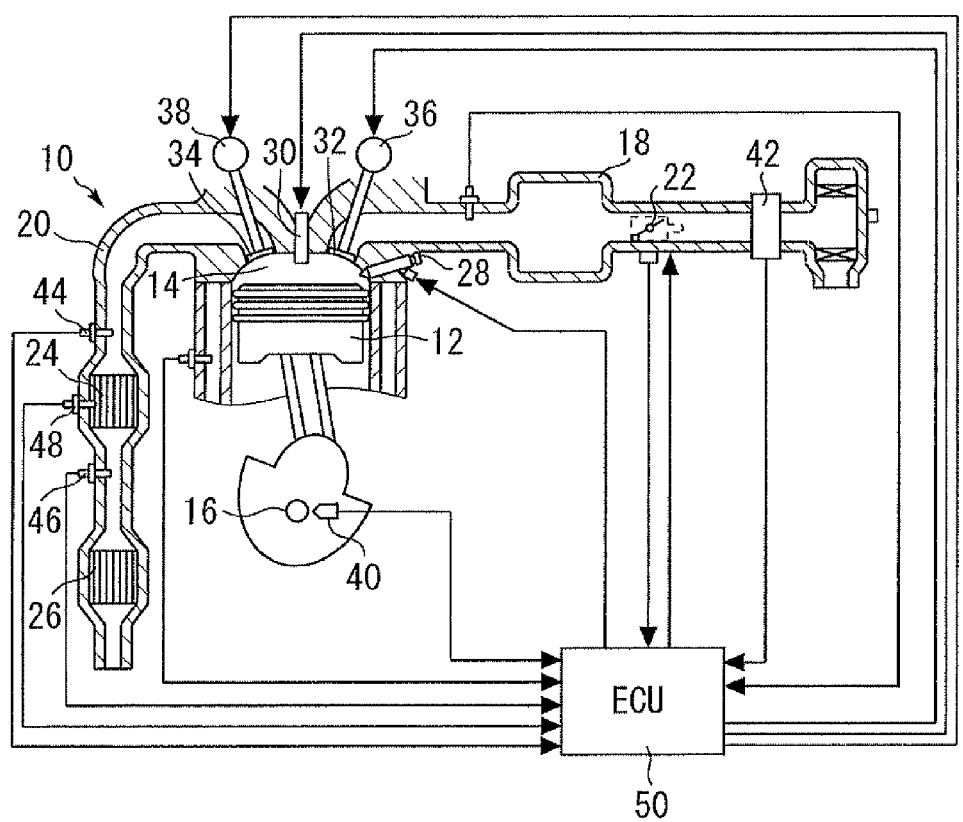
FIG. 1 is a configuration diagram of an engine that is mounted in a hybrid vehicle according to Embodiment 1 of the present invention.

Hereunder, Embodiment 1 of the present invention is described while referring to FIGS. 1 to 8. FIG. 1 is a configuration diagram of an engine that is mounted in a hybrid vehicle according to Embodiment 1 of the present invention. The system of the present embodiment includes an engine 10 as an internal combustion engine. A combustion chamber 14 is formed by a piston 12 in each cylinder of the engine 10. Each piston 12 is connected to a crankshaft 16 that is an output shaft of the engine 10. The engine 10 also includes an intake passage 18 that draws intake air into the combustion chamber 14 (inside the cylinder) of each cylinder, and an exhaust passage 20 through which exhaust gas is discharged from inside the cylinders. An electronically controlled throttle valve 22 that increases or decreases an intake air amount is provided in the intake passage 18. Further, an upstream catalyst (SC) 24 and a downstream catalyst (UFC) 26 that purify exhaust gas are arranged in series in the exhaust passage 20. Three-way catalysts can be used as the catalysts 24 and 26.

Each cylinder is provided with a fuel injection valve 28 that injects fuel into the cylinder, and a spark plug 30 that ignites an air-fuel mixture in the cylinder. Each cylinder is also provided with an intake valve 32 that opens and closes the intake passage 18 with respect to the inside of the cylinder, and an exhaust valve 34 that opens and closes the exhaust passage 20 with respect to the inside of the cylinder. The intake valve 32 and the exhaust valve 34 are driven by an intake variable valve mechanism 36 and an exhaust variable valve mechanism 38, respectively. The variable valve mechanisms 36 and 38 have a known configuration as described, for example, in Japanese Patent Laid-Open No. 2008-121458, and are equipped with a valve stop mechanism that is capable of stopping the valves 32 and 34 in a closed state. More specifically, the valve stop mechanism includes two swing arms that transmit an acting force of a camshaft (cam) of the engine 10 to rocker arms of the valves 32 and 34, and a connecting pin that is driven by an actuator for connecting the swing arms and releasing the connection of the swing arms. At a time of non-operation of the valve stop mechanism, a state is entered in which the two swing arms are connected by the connecting pin, and hence the acting force of the cam is transmitted to the rocker arms via the respective swing arms, and the valves open and close. In contrast, at a time of operation of the valve stop mechanism, since the connecting state of the two swing arms is released, the acting force of the cam is not transmitted to the rocker arms, and the valves stop in a closed state.

The system of the present embodiment is also provided with a sensor system that includes a crank angle sensor 40, an air flow sensor 42, a main air-fuel ratio sensor 44, a sub-O2 sensor 46, a catalyst temperature sensor 48 and the like, as well as an ECU (Electronic Control Unit) 50 for controlling the operating state of the engine 10. First, the sensor system will be described. The crank angle sensor 40 outputs a signal that is synchronous with rotation of the crankshaft 16. The airflow sensor 42 detects an intake air amount. The main air-fuel ratio sensor 44 detects an exhaust air-fuel ratio on an upstream side of the upstream catalyst 24 as a continuous value. The sub-O2 sensor 46 is disposed between the catalysts 24 and 26, and outputs a rich signal when the exhaust air-fuel ratio on the downstream side of the upstream catalyst 24 is richer than a theoretical air-fuel ratio, and outputs a lean signal when the exhaust air-fuel ratio is leaner than the theoretical air-fuel ratio. The catalyst temperature sensor 48 detects the temperature of the upstream catalyst 24.

In addition to the aforementioned sensors 40 to 48, the sensor system also includes various sensors that are necessary for control of the vehicle and the engine (for example, a water temperature sensor that detects the temperature of engine cooling water, a throttle sensor that detects a degree of throttle opening, and a degree of accelerator opening sensor that detects a degree of accelerator opening and the like). These sensors are connected to an input side of the ECU 50. Various actuators including the throttle valve 22, the fuel injection valve 28, the spark plug 30 and the variable valve mechanisms 36 and 38 and the like are connected to an output side of the ECU 50.

The ECU 50 performs operation control by detecting operating information of the engine by means of the sensor system, and driving each actuator based on the detection result. More specifically, the ECU 50 detects the number of engine revolutions and the crank angle based on the output of the crank angle sensor 40, and calculates the engine load based on an intake air amount that is detected by the air flow sensor 42 and the number of engine revolutions. Further, the ECU 50 determines the fuel injection timing and ignition timing and the like based on a detection value of the crank angle. The ECU 50 calculates a fuel injection amount based on the intake air amount and the engine load and the like, and drives the fuel injection valve 28 as well as the spark plug 30. In addition, the ECU 50 executes known air-fuel ratio control and a fuel-cut operation based on the output of the sensor system. In the air-fuel ratio control, by adjusting a fuel injection amount based on the output of the main air-fuel ratio sensor 44 and the sub-O2 sensor 46, the ECU 50 executes feedback control of the exhaust air-fuel ratio within a range (vicinity of a stoichiometric air-fuel ratio or the like) in which the purification efficiency of the catalysts 24 and 26 increases. Further, in a fuel-cut operation, the ECU 50 determines whether or not a predetermined fuel-cut operation condition (when a deceleration operation starts, a time of high speed operation, or the like) is established based on a degree of accelerator opening or the like, and if the determined result is affirmative, the ECU 50 stops fuel injection.

Figure 2:
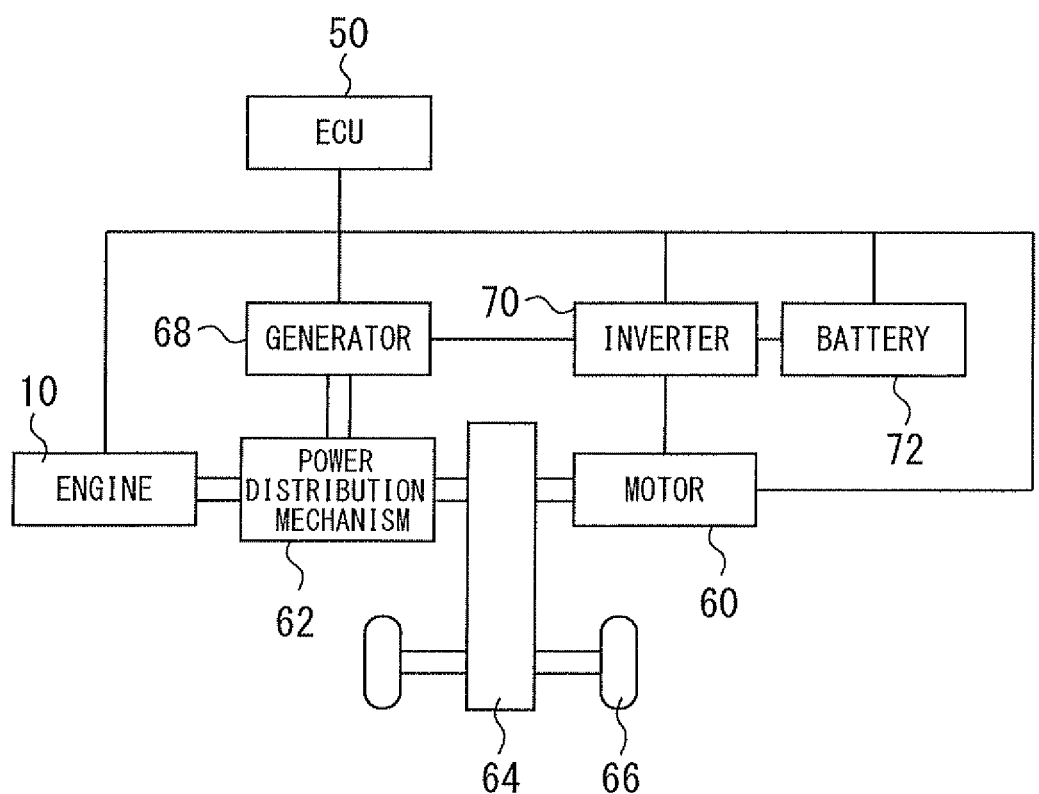
FIG. 2 is a configuration diagram that illustrates the system configuration of the hybrid vehicle.

Next, the hybrid vehicle in which the engine 10 is mounted is described referring to FIG. 2. FIG. 2 is a configuration diagram that illustrates the system configuration of the hybrid vehicle. An electrically powered motor 60 that, together with the engine 10, constitutes a power source of the vehicle is mounted in the hybrid vehicle. Output sides of the engine 10 and the motor 60 are coupled to a power distribution mechanism 62. An output side of the power distribution mechanism 62 is coupled to wheels 66 through a transfer mechanism 64 including a deceleration mechanism and the like, and is also coupled to a generator 68. The motor 60 and the generator 68 are connected to a battery 72 through an inverter 70.

In this case, the power distribution mechanism 62 transfers the driving forces of the engine 10 and the motor 60 to the transfer mechanism 64 at a desired ratio in accordance with a control signal that is input from the ECU 50. Accordingly, by controlling the power distribution mechanism 62, the ECU 50 can arbitrarily change the proportions of the driving forces of the engine 10 and the motor 60 that are transferred to the wheels 66 side. Thus, engine driving in which the vehicle drives by means of the driving force of the engine 10, EV driving in which the vehicle drives by means of the driving force of the motor 60, and HV driving in which the vehicle drives by combining the use of both driving forces are realized. Further, according to the system of the present embodiment, in a state in which the engine 10 is stopped, the crankshaft 16 can be rotated (run idly) through the power distribution mechanism 62 by the motor 60.

[Features of Embodiment 1]

A fuel-cut operation is executed by the ECU 50 at the time of a deceleration operation of the engine 10 and the like. During the fuel-cut operation, there is the problem that the catalysts 24 and 26 are liable to deteriorate due to air (oxygen) being supplied thereto, while on the other hand, if the oxygen supply is cut off, rich poisoning is liable to occur. Therefore, according to the present embodiment, a configuration is adopted in which execution of valve stopping control and valve stopping prohibition control is switched in accordance with the poisoning state of the catalysts 24 and 26, and in which the crankshaft 16 is driven by the motor 60 when executing the valve stopping prohibition control. These controls are described hereunder.

(Catalyst Poisoning Estimation Control)

The degree of progression of rich poisoning that occurs in the catalysts 24 and 26 can be estimated based on the following methods (1) to (3).

(1) There is a correlation between the degree of progression of rich poisoning and the amount of HC (hydrocarbon) that flows into the relevant catalyst. The amount of HC increases in accordance with the fuel injection amount. Therefore, the degree of progression of rich poisoning can be estimated by integrating fuel injection amounts during operation of the engine, and estimating the degree of progression of rich poisoning based on the integrated value. More specifically, the larger that the integrated value of the fuel injection amounts is, the greater the degree to which rich poisoning of the catalysts is estimated to have progressed.

(2) A proportional relationship is established between the fuel injection amount and the intake air amount when the air-fuel ratio is controlled to a theoretical air-fuel ratio (stoichiometric air-fuel ratio) by air-fuel ratio control or the like. In this case, the degree of progression of rich poisoning can be estimated based on an integrated value of intake air amounts that are integrated at timings excluding timings that occur during a fuel-cut operation. More specifically, the larger that the integrated value of the intake air amounts is, the greater the degree to which rich poisoning of the catalysts is estimated to have progressed.

(3) Since exhaust gas stagnates around the catalysts while the engine is stopped and during execution of valve stopping, rich poisoning is liable to progress. Therefore, the degree of progression of rich poisoning can be estimated based on the stopping time of the engine or the duration of valve stopping. More specifically, the longer that these time periods are, the greater the degree to which rich poisoning of the catalysts is estimated to have progressed.

Figure 3:
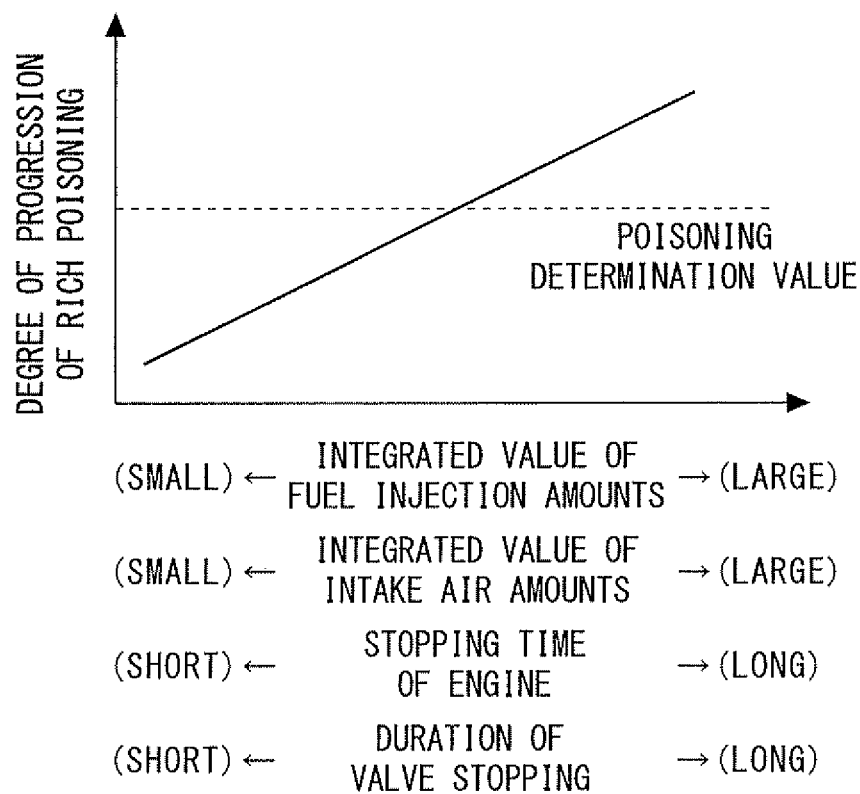
FIG. 3 shows data maps for estimating a degree of progression of rich poisoning based on various parameters.

The ECU 50 estimates the degree of progression of rich poisoning using any one of the above described methods (1) to (3) independently, or by using a combination of some of the methods (1) to (3). Therefore, data maps shown in FIG. 3 are previously stored in the ECU 50. FIG. 3 shows data maps for estimating a degree of progression of rich poisoning based on various parameters. In this connection, although three data maps that correspond to the above described methods (1) to (3) are shown in one diagram in FIG. 3, these data maps are set as individual data maps.

In the catalyst poisoning estimation control, the degree of progression of rich poisoning is calculated by the ECU 50 based on the above described data maps, and the ECU 50 determines whether or not the calculation value is greater than a predetermined determination value (poisoning determination value). If the determined result is affirmative, the ECU 50 determines that the catalysts 24 and 26 are in a rich poisoning state. On the other hand, if the degree of progression of rich poisoning is less than or equal to the poisoning determination value, the ECU 50 determines that rich poisoning of the catalyst has not occurred. Note that, in the above description, a configuration is adopted in which the degree of progression of rich poisoning is calculated based on various parameters that include an integrated value of fuel injection amounts, an integrated value of intake air amounts in an operating state other than a fuel-cut operation state, and a stopping time of the engine or the duration of valve stopping. However, the present invention is not limited thereto, and a configuration may also be adopted in which a value of a parameter described above is used as it is as the degree of progression of rich poisoning.

Figure 4:
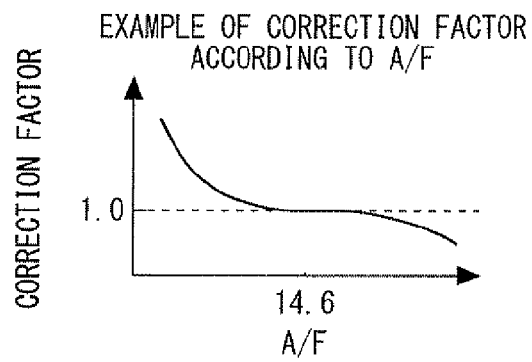
FIG. 4 is a data map for calculating a correction factor based on the air-fuel ratio (A/F).
Figure 5:
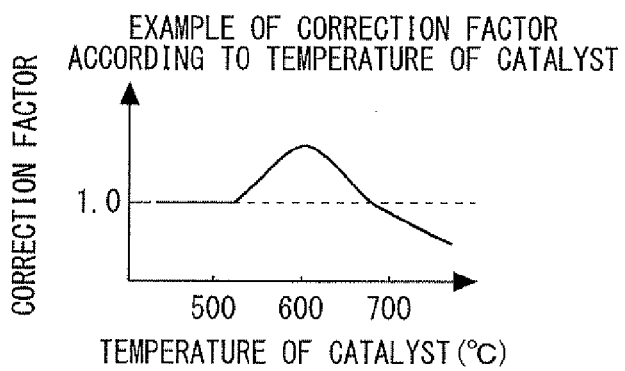
FIG. 5 is a data map for calculating a correction factor based on the catalyst temperature.
Figure 6:
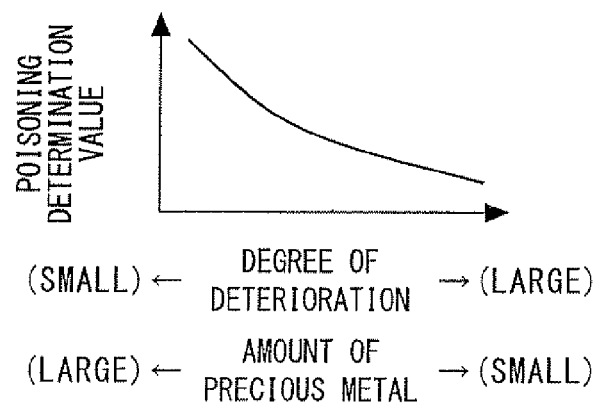
FIG. 6 is a data map for calculating a poisoning determination value based on the amount of precious metal included in a catalyst and the degree of deterioration of the catalyst.

The degree of progression of rich poisoning also fluctuates according to factors other than the respective parameters described above. Therefore, as shown in FIGS. 4 to 6, data maps of correction factors that correct the degree of progression of rich poisoning or the poisoning determination value based on other factors are previously stored in the ECU 50. These data maps will now be described. FIG. 4 is a data map for calculating a correction factor based on the air-fuel ratio (A/F). The HC concentration in exhaust gas increases as the air-fuel ratio becomes richer, and rich poisoning progresses in accompaniment therewith. Consequently, the data map shown in FIG. 4 is set so that the correction factor increases as the air-fuel ratio becomes richer.

FIG. 5 is a data map for calculating a correction factor based on the catalyst temperature. The degree of progression of rich poisoning changes in accordance with a temperature region of the catalyst. Consequently, the data map shown in FIG. 5 is set in accordance with the temperature characteristics of rich poisoning so that, for example, the correction factor is a maximum at a temperature of approximately 600° C. and decreases as the temperature becomes higher than 600° C. The ECU 50 calculates respective correction factors based on the data maps shown in the above described FIG. 4 and FIG. 5, and corrects the degree of progression of rich poisoning by multiplying the degree of progression by these correction factors.

FIG. 6 is a data map for calculating a poisoning determination value based on the amount of precious metal included in a catalyst and the degree of deterioration of the catalyst. There is a correlation between the impact of rich poisoning on catalyst performance and the amount of precious metal contained in the catalyst or the degree of deterioration of the catalyst. Hence, a configuration may also be adopted in which the poisoning determination value can be adjusted on the basis of the aforementioned correlations. More specifically, when the amount of precious metal contained in the catalyst is small or when the degree of deterioration of the catalyst is large, even if the level of rich poisoning is the same, the impact of rich poisoning becomes relatively large, and hence it is preferable to determine the occurrence of rich poisoning at an early stage. Therefore, the data map shown in FIG. 6 is set so that the poisoning determination value decreases as the amount of precious metal contained in the catalyst decreases, or as the degree of deterioration of the catalyst increases. The ECU 50 calculates a poisoning determination value based on the data map shown in FIG. 6, and compares the calculated value with the degree of progression of rich poisoning. In this connection, the amount of precious metal contained in the catalyst is previously stored in the ECU 50 as known data, and the degree of deterioration of the catalyst is obtained by a known deterioration determining method.

A catalyst that is in a rich poisoning state recovers from the poisoning state when oxygen is supplied thereto. Since there is a correlation between the degree of recovery from rich poisoning and the amount of oxygen that flows into the catalyst, the degree of recovery from rich poisoning is estimated based on an integrated value of intake air amounts during a fuel-cut operation. As a specific example, the ECU 50 integrates intake air amounts in a state in which valve stopping is prohibited during a fuel-cut operation, and if the integrated value is equal to or greater than a predetermined determination value (poisoning recovery determination value), the ECU 50 determines that the catalyst has recovered from rich poisoning.

According to the above described configuration, a rich poisoning state of the catalysts can be accurately estimated based on various parameters that have a correlation with rich poisoning. Next, valve stopping control and valve stopping prohibition control that are executed based on a rich poisoning state of the catalysts are described.

(Valve Stopping Control)

Valve stopping control is control that, during a fuel-cut operation, when the catalysts are not in a rich poisoning state (or when the catalysts have recovered from rich poisoning), maintains the intake valve 32 and the exhaust valve 34 in a closed state by means of the variable valve mechanisms 36 and 38, and executes valve stopping with respect to the valves 32 and 34. According to this control, during a fuel-cut operation, intake air can be prevented from flowing into the exhaust passage 20 through the inside of the cylinders. Therefore, the oxygen supply to the catalysts can be blocked, and deterioration of the catalysts can be suppressed. Further, according to the valve stopping control, the inside of the cylinders is maintained in a stoichiometric atmosphere during a fuel-cut operation, and thus the amount of increase in a fuel injection amount that is required at a time of reversion from the fuel-cut operation can be suppressed. It is thereby possible to improve fuel consumption. In this connection, according to the present invention a configuration may also be adopted in which, in the valve stopping control, only one of the valves 32 and 34, at least, is stopped and the other valve is opened and closed. In this case also, the supply of oxygen to the catalysts can be suppressed.

(Valve Stopping Prohibition Control)

If valve stopping control is executed more than necessary, it leads to rich poisoning of the catalysts and a deterioration in fuel consumption. Therefore, according to the present embodiment, valve stopping prohibition control is executed when it is determined that a catalyst is in a rich poisoning state during a fuel-cut operation, and that the catalyst temperature is equal to or less than a predetermined determination temperature. In the valve stopping prohibition control, the above described valve stopping control is prohibited and the valves 32 and 34 are opened and closed in the same manner as at a time of normal operation. In this connection, the term "determination temperature" refers to a determination value for determining a high temperature region in which deterioration of a catalyst is liable to progress due to contact with oxygen, which is a value that is stored in advance in the ECU 50. When the catalyst temperature is higher than the determination temperature, the catalyst will deteriorate due to contact with oxygen if valve stopping is prohibited, and hence even in a state in which rich poisoning has been determined, priority is given to preventing deterioration of the catalyst, and therefore valve stopping control is continued.

Further, during execution of valve stopping prohibition control, as described above, it is determined whether or not the catalysts have recovered from rich poisoning based on an integrated value of intake air amounts. If it is determined that the catalysts have recovered from rich poisoning, the valve stopping prohibition control is ended and prohibition of valve stopping is released. As a result, if a fuel-cut operation is continuing at a time point at which the valve stopping prohibition control ends, valve stopping control is resumed. It is thereby possible to improve fuel consumption in the above described manner.

According to the above described valve stopping prohibition control, when it is determined that a catalyst is in a rich poisoning state, the ECU 50 can prohibit valve stopping and supply oxygen to the catalyst. The catalyst can thereby be caused to recover from rich poisoning, and exhaust emissions can be improved. Thus, valve stopping control and valve stopping prohibition control can be used appropriately in accordance with the poisoning state of a catalyst, and both suppression of deterioration of a catalyst and suppression of rich poisoning thereof (improvement of exhaust emissions) can be achieved in a compatible manner.

Further, since valve stopping prohibition control is executed only when the catalyst temperature is less than or equal to the determination temperature, at a time of a high temperature at which the catalysts are liable to deteriorate, valve stopping control is continued and the catalysts are protected from deterioration. In this connection, rich poisoning of a catalyst has a characteristic such that it is difficult for rich poisoning to progress when the catalyst temperature is higher than the determination temperature. Therefore, at the time of a high temperature, the progress of rich poisoning can be adequately suppressed even without executing valve stopping prohibition control.

(Engine Idling Control During Valve Stopping Prohibition)

In some conventional hybrid vehicles, the engine 10 is stopped during a fuel-cut operation. In that case, the engine 10 is disconnected from the drive system (motor 60 side) by the power distribution mechanism 62, and enters a state in which a rotary force is not applied to the crankshaft 16. In this state, since the pumping action of each piston 12 is not adequately exerted, even if valve stopping prohibition control is executed, it is difficult for intake air to reach the positions of the catalysts 24 and 26. Therefore, according to the present embodiment, a configuration is adopted in which the crankshaft 16 is rotationally driven by the motor 60 during execution of valve stopping prohibition control by utilizing the characteristics of a hybrid vehicle.

As a specific example, when executing valve stopping prohibition control, the ECU 50 maintains the engine 10 and the drive system in a connected state by means of the power distribution mechanism 62, and drives the motor 60. As a result, the crankshaft 16 is forcibly rotationally driven (run idly) by the motor 60, even during a fuel-cut operation. According to this control, in a state in which valve stopping is prohibited, intake air can be efficiently fed to the exhaust passage 20 by the pumping action of the pistons 12, and a sufficient amount of oxygen can be rapidly supplied to the catalysts 24 and 26. Thus, in a hybrid vehicle that stops an engine during a fuel-cut operation also, the effect of valve stopping prohibition control can be adequately exerted, and a catalyst can be caused to recover from rich poisoning efficiently.

Further, the above described idling control of the engine is executed in synchrony with valve stopping prohibition control. More specifically, when the ECU 50 determines that the catalysts have recovered from rich poisoning, the ECU 50 ends the valve stopping prohibition control, stops the motor 60, and disconnects the engine 10 from the drive system. It is thereby possible to suppress electric power consumption of the motor to a required minimum.

(Throttle Valve Opening Control During Valve Stopping Prohibition)

According to the present embodiment, a configuration is adopted that opens the throttle valve 22 during execution of valve stopping prohibition control. At this time, although it is preferable to set the degree of opening of the throttle valve 22 to a fully open state, the degree of opening of the throttle valve 22 need not necessarily be fully open. According to this control, the intake resistance can be reduced and the pumping loss inside the cylinders can be lowered to thereby reduce the load of the motor 60. Further, an air amount supplied to the catalysts can be increased, and recovery from rich poisoning can be promoted with the minimum number of engine revolutions. Accordingly, electric power consumption of the motor 60 can be suppressed, and fuel consumption can be improved.

[Specific Processing to Realize Embodiment 1]

Figure 7:
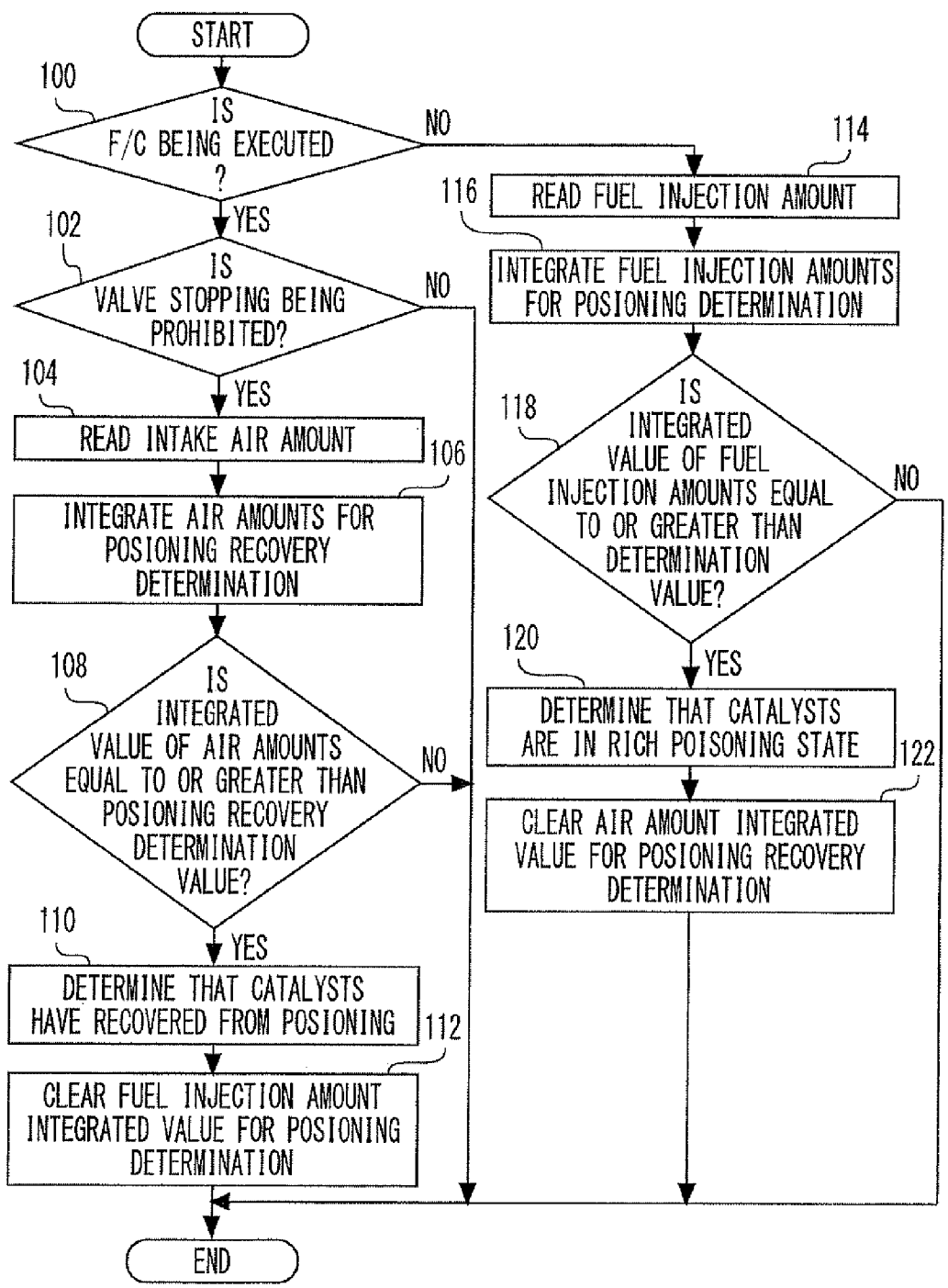
FIG. 7 is a flowchart that illustrates catalyst poisoning estimation control that is executed by the ECU according to Embodiment 1 of the present invention.
Figure 8:
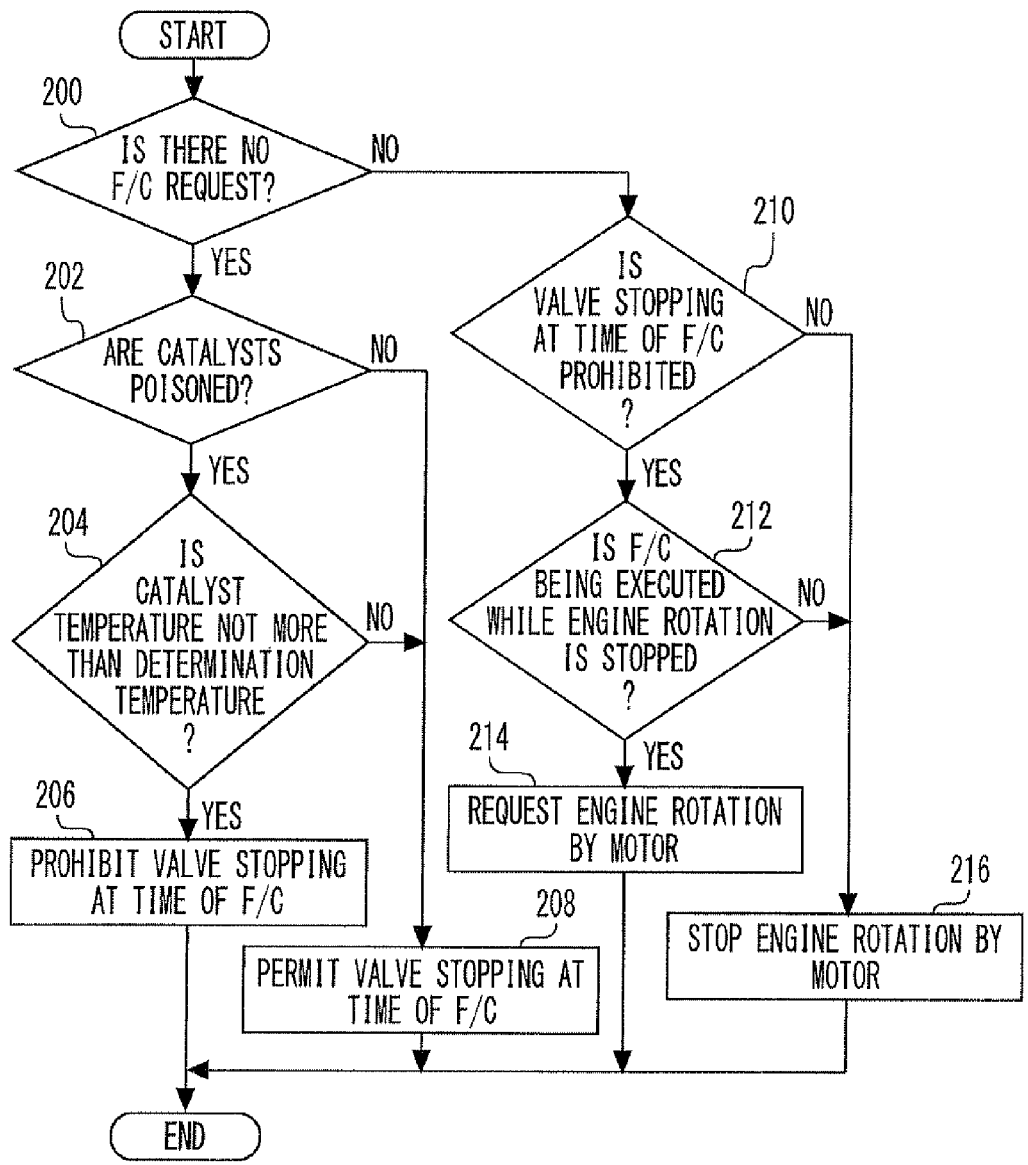
FIG. 8 is a flowchart illustrating control that is executed concurrently with the control shown in FIG. 7 by the ECU according to Embodiment 1 of the present invention.

Next, specific processing for implementing the above described control is described with reference to FIG. 7 and FIG. 8. It is assumed that the routines shown in FIGS. 7 and 8 are repeatedly executed while the vehicle is in operation. First, FIG. 7 is a flowchart that illustrates catalyst poisoning estimation control that is executed by the ECU according to Embodiment 1 of the present invention.

According to the routine shown in FIG. 7, first, in step 100, the ECU 50 determines whether or not a fuel-cut operation (F/C) is being executed. If the result determined in step 100 is affirmative, in step 102 the ECU 50 determines whether or not valve stopping is being prohibited, that is, the ECU 50 determines whether or not valve stopping prohibition control is being executed. In contrast, if the result determined in step 100 is not affirmative, the processing shifts to step 114 that is described later, while if the result determined in step 102 is not affirmative, the control is ended as it is.

If the results determined in steps 100 and 102 are both affirmative, the state is one in which valve stopping has been prohibited during a fuel-cut operation, and therefore, in step 104, the ECU 50 reads an intake air amount based on the output of the air flow sensor 42. Subsequently, in step 106, to determine whether the catalysts have recovered from rich poisoning, the ECU 50 integrates (adds) the intake air amount for the current calculation cycle with an integrated value of intake air amounts calculated in the calculation cycles up to the previous calculation cycle. If the state is one in which valve stopping prohibition control is continuing, step 106 is repeated for each calculation cycle, and hence the integrated value of intake air amounts gradually increases.

Next, in step 108, the ECU 50 determines whether or not the integrated value of intake air amounts is equal to or greater than the poisoning recovery determination value. If the result determined in step 108 is affirmative, in step 110 the ECU 50 determines that the catalysts have recovered from rich poisoning. Thereafter, in step 112, the ECU 50 clears a determination parameter (for example, an integrated value of fuel injection amounts) that is used for determining the occurrence of rich poisoning to zero.

In contrast, if the result determined in step 100 is not affirmative, in step 114, the ECU 50 reads a fuel injection amount that has been set by fuel injection control. Next, in step 116, to determine the degree of progression of rich poisoning, the ECU 50 integrates (adds) the fuel injection amount for the current calculation cycle with an integrated value of fuel injection amounts calculated in the calculation cycles up to the previous calculation cycle. If the state is one in which a fuel-cut operation is not been executed, step 116 is repeated for each calculation cycle, and hence the integrated value of fuel injection amounts gradually increases.

Next, in step 118, the ECU 50 determines whether or not the integrated value of fuel injection amounts is equal to or greater than the poisoning determination value. If the result determined in step 118 is affirmative, in step 120 the ECU 50 determines that the catalysts are in a rich poisoning state. Thereafter, in step 122, the ECU 50 clears the integrated value of intake air amounts that had been integrated for poisoning recovery determination to zero.

Next, the control illustrated in FIG. 8 will be described. FIG. 8 is a flowchart illustrating control that is executed concurrently with the control shown in FIG. 7 by the ECU according to Embodiment 1 of the present invention. According to the routine shown in FIG. 8, first, in step 200, the ECU 50 determines whether or not there is a request to execute a fuel-cut operation. A request to execute a fuel-cut operation is a request that is generated when a predetermined fuel-cut operation condition is established, such as, for example, when a deceleration operation is started. The ECU 50 is configured so as to execute a fuel-cut operation when such a request is generated.

If the result determined in step 200 is affirmative, the state is one in which a request to execute a fuel-cut operation has not been generated (a fuel-cut operation is not being performed). In this case, first, in step 202, the ECU 50 refers to the result determined by the catalyst poisoning estimation control, and determines whether or not the catalysts are in a rich poisoning state. Next, in step 204, the ECU 50 determines whether or not the catalyst temperature is less than or equal to the aforementioned determination temperature. If the results determined in both steps 202 and 204 are affirmative, in step 206 the ECU 50 prohibits valve stopping at the time of a fuel-cut operation. As a result, when a fuel-cut operation is started after execution of step 206, valve stopping prohibition control is executed and a state is entered in which stopping of the valves is prohibited. On the other hand, if the result determined in either of steps 202 and 204 is not affirmative, in step 208, the ECU 50 permits valve stopping at the time of a fuel-cut operation. As a result, when a fuel-cut operation is started after execution of step 208, valve stopping control is executed and the valves enter a stopped state.

On the other hand, if the result determined in step 200 is not affirmative, the state is one in which a request to perform a fuel-cut operation is being generated (a state during a fuel-cut operation). In this case, in step 210, the ECU 50 determines whether or not valve stopping prohibition is being performed at a time of a fuel-cut operation, that is, whether or not valve stopping prohibition control is being executed. Next, in step 212, the ECU 50 determines whether or not a fuel-cut operation is being performed in which rotation of the engine (crankshaft) has stopped. If the results determined in both steps 210 and 212 are affirmative, the state is one in which valve stopping has been prohibited during a fuel-cut operation and in which the crankshaft 16 is not rotating. Hence, in step 214, the ECU 50 requests engine rotation by the motor 60. As a result, the aforementioned engine idling control is executed, and the crankshaft 16 is rotationally driven by the motor 60. On the other hand, if the result determined in either of steps 210 and 212 is not affirmative, since it is not necessary to execute engine idling control, in step 216, the ECU 50 stops engine rotation by the motor 60 (cancels the request to execute engine rotation).

In addition, according to the present embodiment, a configuration may also be adopted in which control that is illustrated in FIG. 9 is executed by the ECU 50. FIG. 9 is a flowchart showing other control that is executed instead of the control shown in FIG. 8 according to Embodiment 1 of the present invention. According to the routine shown in FIG. 9, first, in steps 300 and 302, processing is executed that is the same as in steps 200 and 202 in FIG. 8. In this case, if the result determined in step 300 is affirmative, since a fuel-cut operation is not being executed, the processing of step 302 and thereafter is executed. In contrast, if the result determined in step 300 is not affirmative, since a fuel-cut operation is being executed, the processing shifts to step 312 that is described later.

If the result determined in step 302 is affirmative, in step 304 the ECU 50 prohibits valve stopping at the time of a fuel-cut operation. In contrast, if the result determined in step 302 is not affirmative, in step 306 the ECU 50 permits valve stopping at the time of a fuel-cut operation. As the result of the above described processing, when a fuel-cut operation is started, valve stopping prohibition control or valve stopping control is executed in substantially the same manner to the case of the routine shown in FIG. 8. Subsequently, in step 308, since a fuel-cut operation is not being executed, the ECU 50 stops engine rotation by the motor 60, and in step 310 the ECU 50 stops valve opening control with respect to the throttle valve 22. As a result, the throttle valve 22 is retained, for example, at a fully closed position.

In contrast, in step 312, the ECU 50 determines whether the catalysts have not recovered from rich poisoning by referring to the result determined by the catalyst poisoning estimation control. Next, in step 314, the ECU 50 determines whether or not the catalyst temperature is less than or equal to the determination temperature. If the result determined in either of steps 312 and 314 is not affirmative, since the catalysts have recovered from rich poisoning or the catalyst temperature is high, it is preferable to block the catalysts off from the supply of oxygen. Therefore, in this case, the processing shifts to step 306. As a result, as well as executing valve stopping control, the engine rotation by the motor 60 is stopped and the valve opening control of the throttle valve 22 is stopped.

On the other hand, if the results determined in both steps 312 and 314 are affirmative, since the circumstances are such that oxygen should be supplied to the catalysts, in step 316 the ECU 50 determines whether or not valve stopping prohibition control is being executed. If the result determined in step 316 is not affirmative, the processing shifts to step 304. In contrast, if the result determined in step 316 is affirmative, in step 318, the ECU 50 determines whether or not the current state is one in which a fuel-cut operation is being performed in which rotation of the crankshaft 16 is stopped. If the result determined in step 318 is affirmative, in step 320, the ECU 50 requests engine rotation by the motor 60, and in step 322, the ECU 50 executes valve opening control of the throttle valve 22. In contrast, if the result determined in step 318 is not affirmative, since it is not necessary to rotate the crankshaft 16, the ECU 50 executes only the processing of step 322, and does not execute the processing of step 320.

Note that, in the above described Embodiment 1, control that determines whether or not a predetermined fuel-cut operation condition (when a deceleration operation starts, a time of high speed operation, or the like) is established based on a degree of accelerator opening or the like and stops fuel injection when the determination result is affirmative represents a specific example of "fuel-cut operation control means". Further, FIG. 3 to FIG. 7 illustrate a specific example of "poisoning state estimation means" according to claim 1 and claims 6 to 8. In addition, in FIG. 8 and FIG. 9, steps 202 to 208, 302 to 306, and 312 to 316 represent a specific example of "valve operation control means" according to claims 1, 3 and 4, steps 214, 216, 308 and 320 represent a specific example of "engine idling means" according to claims 1 and 5, and steps 310 and 322 represent a specific example of "throttle valve opening control means" according to claim 2.

DESCRIPTION OF REFERENCE NUMERALS 10 engine (internal combustion engine), 12 piston, 14 combustion chamber, 16 crankshaft (output shaft), 18 intake passage, 20 exhaust passage, 22 throttle valve, 24, 26 catalyst, 28 fuel injection valve, 30 spark plug, 32 intake valve, 34 exhaust valve, 36 intake variable valve mechanism, 38 exhaust variable valve mechanism, 40 crank angle sensor, 42 air flow sensor, 44 main air-fuel ratio sensor, 46 sub-O2 sensor, 48 catalyst temperature sensor, 50 ECU, 60 motor, 62 power distribution mechanism

The invention claimed is:

1. A control apparatus for a hybrid vehicle that comprises:
an internal combustion engine comprising a valve stop mechanism configured to stopping at least one valve among an intake valve and an exhaust valve in a closed state, and a catalyst that purifies exhaust gas;
a motor that is an electric motor that, together with the internal combustion engine, constitutes a power source of the vehicle, and that is configured to driving an output shaft of the internal combustion engine that is in a stopped state;
poisoning state estimation means that estimates a rich poisoning state of the catalyst based on an operating state of the internal combustion engine;
fuel-cut operation control means that, when a predetermined fuel-cut operation condition is established during operation of the internal combustion engine, executes a fuel-cut operation that stops a fuel supply to the internal combustion engine;
valve operation control means that, during the fuel-cut operation, controls the valve stop mechanism and executes valve stopping in case where it is estimated by the poisoning state estimation means that the catalyst is not in a rich poisoning state, or a temperature of the catalyst is higher than a predetermined determination temperature, and the valve operation control means that, during the fuel-cut operation, prohibits valve stopping in case where it is estimated that the catalyst is in a rich poisoning state, and a temperature of the catalyst is less than or equal to the determination temperature; and
engine idling means that, during the fuel-cut operation, when valve stopping with respect to the valve is prohibited by the valve operation control means, drives the output shaft of the internal combustion engine by means of the motor and supplies oxygen to the catalyst.

2. The control apparatus for a hybrid vehicle according to claim 1, further comprising throttle valve opening control means that, during the fuel-cut operation, when valve stopping with respect to the valve is prohibited by the valve operation control means, opens a throttle valve of the internal combustion engine.

3. The control apparatus for a hybrid vehicle according to claim 1, wherein the valve operation control means is configured so that, in a state in which valve stopping during the fuel-cut operation is prohibited, if the catalyst recovers from a rich poisoning state as a result of receiving an oxygen supply, the valve operation control means releases prohibition of the valve stopping.

4. The control apparatus for a hybrid vehicle according to claim 1, wherein the engine idling means is configured so that, in a state in which the output shaft of the internal combustion engine is driven by the motor, if the catalyst recovers from a rich poisoning state as a result of receiving an oxygen supply, the engine idling means stops driving of the output shaft.

5. The control apparatus for a hybrid vehicle according to claim 1, wherein the poisoning state estimation means is configured to estimate whether or not the catalyst is in a rich poisoning state based on an integrated value of fuel injection amounts and/or an integrated value of intake air amounts of the internal combustion engine.

6. The control apparatus for a hybrid vehicle according to claim 1, wherein the poisoning state estimation means is configured to estimate whether or not the catalyst is in a rich poisoning state based on a stopping period of the internal combustion engine or a duration of the valve stopping.

7. The control apparatus for a hybrid vehicle according to claim 1, wherein the poisoning state estimation means is configured to estimate whether or not the catalyst has recovered from a rich poisoning state based on an integrated value of intake air amounts during the fuel-cut operation.

* * * * *